(12) United States Patent
Stitou et al.

(10) Patent No.: US 7,775,066 B2
(45) Date of Patent: Aug. 17, 2010

(54) METHOD AND DEVICE FOR RAPID AND HIGH-POWER COLD PRODUCTION

(75) Inventors: Driss Stitou, St Nazaire (FR); Olivier Bertrand, Perpignan (FR); Bernard Spinner, Fabrèges (FR); Bruno Spinner, legal representative, Fabrèges (FR); Caroline Spinner Brossard, legal representative, Brassac (FR); Anne Christel Spinner Kohler, legal representative, Narbonne (FR); Nathalie Mazet, legal representative, Perpignan (FR); Martin Spinner, legal representative, Perpignan (FR)

(73) Assignee: Centre National de la Recherche Scientifique, Paris (FR)

( * ) Notice: Subject to any disclaimer, the term of this patent is extended or adjusted under 35 U.S.C. 154(b) by 876 days.

(21) Appl. No.: 10/549,326

(22) PCT Filed: Mar. 12, 2004

(86) PCT No.: PCT/FR2004/000617

§ 371 (c)(1),
(2), (4) Date: Sep. 27, 2006

(87) PCT Pub. No.: WO2004/085933

PCT Pub. Date: Oct. 7, 2004

(65) Prior Publication Data

US 2008/0202132 A1 Aug. 28, 2008

(30) Foreign Application Priority Data

Mar. 18, 2003 (FR) .................................. 03 03306

(51) Int. Cl.
*F25B 17/08* (2006.01)
*F25B 15/00* (2006.01)
*F25D 3/00* (2006.01)

(52) U.S. Cl. .............................. 62/480; 62/101; 62/59; 62/476

(58) Field of Classification Search .................. 62/101, 62/59, 476, 480
See application file for complete search history.

(56) References Cited

U.S. PATENT DOCUMENTS

| 1,932,492 | A | * | 10/1933 | Smith .......................... 62/79 |
| 4,944,159 | A | | 7/1990 | Crozat |
| 5,360,057 | A | | 11/1994 | Rockenfeller et al. |
| 5,445,217 | A | * | 8/1995 | Castaing et al. ........ 165/104.12 |
| 5,924,301 | A | | 7/1999 | Cook |
| 5,941,091 | A | | 8/1999 | Broadbent |
| 6,205,807 | B1 | * | 3/2001 | Broadbent ................... 62/347 |
| 6,305,186 | B1 | | 10/2001 | Py et al. |
| 6,357,720 | B1 | * | 3/2002 | Shapiro et al. .............. 249/119 |

FOREIGN PATENT DOCUMENTS

FR 2 749 377 12/1997

OTHER PUBLICATIONS

International Search Report dated Sep. 8, 2004.
* cited by examiner

*Primary Examiner*—Thomas E Denion
*Assistant Examiner*—Michael Carton
(74) *Attorney, Agent, or Firm*—Merchant & Gould PC

(57) ABSTRACT

The invention relates to refrigeration using a thermochemical system based on the coupling of two reversible physico-chemical phenomena between a gas and a solid or liquid sorbent, one at low temperature (the LT phenomenon) and the other at a higher temperature (the HT phenomenon).

The LT phenomenon is a liquid/gas phase change of the fluid G or an absorption of the fluid G by a liquid sorbent. The HT phenomenon is a reversible sorption of the fluid G by a liquid or solid sorbent. The endothermic phase of the LT phenomenon takes place in a reactor thermally isolated from the ambient environment. The exothermic phase of the LT phenomenon takes place in a condenser in communication with the reactor in which the HT phenomenon takes place, the condensed fluid G then being transferred to the reactor in which the endothermic phase of the LT phenomenon takes place.

22 Claims, 7 Drawing Sheets

METHOD AND DEVICE FOR RAPID AND HIGH-POWER COLD PRODUCTION

BACKGROUND OF THE INVENTION

1. Field of the Invention

The present invention relates to a method and to a device for rapid high-power refrigeration.

2. Description of the Related Art

It is known to produce heat or refrigeration in installations based on liquid/gas phase changes or reversible sorptions between a gas, called the working gas, and a liquid or solid sorbent. A reversible sorption may be an absorption of a gas by a liquid, an adsorption of a gas on a solid, or a reaction between a gas and a solid. A reversible sorption between a sorbent S and a gas G is exothermic in the synthesis direction S+G→SG, and endothermic in the decomposition direction SG→S+G. In a liquid/gas phase change of G, condensation is exothermic and evaporation is endothermic. These reversible phenomena may be represented on the Clausius-Clapeyron plot by their equilibrium line:

$$\ln P = f(-1/T), \text{ more precisely } \ln P = -\frac{\Delta H}{RT} + \frac{\Delta S}{R}$$

P and T being the pressure and temperature respectively, $\Delta H$ and $\Delta S$ being the enthalpy and the entropy, respectively, of the phenomenon (decomposition, synthesis, evaporation, condensation) involved, and R being the ideal gas constant. The endothermic step may be profitably employed in an installation of this type to freeze various products (especially water for obtaining ice) or for the production of cold water.

Thus, EP-0,810,410 describes a device comprising a reactor that is the site of a thermochemical reaction or of a solid-gas adsorption involving a gas G, and a chamber connected to the reactor via a line provided with a valve and operating alternately as evaporator and as condenser for the gas G. The reactor includes means for heating its contents and means for extracting the heat of the exothermic synthesis reaction, these means being formed either by a heat exchanger or by the increase in thermal mass of the reactor. The reactor is arranged in such a way that, with its contents, it has a thermal mass sufficient to absorb the heat produced during the exothermic reaction. The method of managing this device consists in bringing the evaporator/condensor into communication with the reactor when the evaporator/condenser is filled with the working gas in liquid form, this having the effect of cooling the evaporator/condenser by evaporation, and then in operating the means intended to heat the solid so as to deliver and condenser the gas in the evaporator/condenser. The operation of the means intended to reheat the solid in the reactor starts before the previous step has been completed. However, in this device, the cycle times are relatively long owing to the fact that the regeneration of the device takes place at a high temperature $T_h$ and the cooling of the reactor takes place at the ambient temperature $T_o$. Consequently, the reactor experiences a relatively large thermal amplitude between the regeneration temperature and the ambient temperature, resulting in a low performance factor. Moreover, since the exothermic condensation takes place in the same chamber as the endothermic evaporation, the thermal amplitude of the evaporator/condenser chamber is high, leading to long cycle times and reducing the performance.

WO-97/40328 describes a refrigeration and/or heat production device comprising two reactors in thermal contact, alternately connected either to a condenser or to an evaporator, respectively. In this device, refrigeration takes place from an evaporator that releases a working gas G which, during the regeneration step, is sent into a condenser.

EP-0,580,848 describes a refrigeration and/or heat production device in which refrigeration takes place from an evaporator that releases the working gas G. The device comprises, on the one hand, an evaporator and a separate condenser and, on the other hand, two sets of two reactors each, the two sets operating in a reversed and alternating manner in order to ensure continuous refrigeration. During the refrigeration phase in one of the sets, the reactors of said set are connected to the evaporator, while, at the same time, the reactors of the second set are connected to the condenser and operate in regeneration phase. Next, the connections are reversed and the reactors of the first set are connected to the condenser for the regeneration phase, whereas the reactors of the second set are connected to the evaporator for the refrigeration phase. The evaporator and the condenser are designed to be able to exchange heat with their environment, thereby reducing the refrigeration efficiency. The devices of the two aforementioned documents of the prior art always comprise two reactors that operate in phase opposition, one of the reactors being connected to the condenser while the other reactor is connected to the evaporator. The evaporator and the condenser are therefore continually in operation and are alternately isolated and connected to one of the reactors.

EP-0,382,586 describes a refrigeration device comprising an evaporator and a condenser for the working gas, and two reactors that are the sites of different reversible phenomena involving the same working gas. The reactors operate alternately. A given reactor is connected to the evaporator when it is in synthesis (refrigeration) phase and connected to the condenser when it is in decomposition (regeneration) phase. The temperature of the condenser is above that of the evaporator. The working gas condensed in the condenser serves to feed the evaporator. The evaporator and the condenser are designed to be able to exchange heat with their environment, thereby reducing the refrigeration efficiency.

The refrigeration methods of the prior art require a particular and relatively complex method of control owing to the difficulty in controlling the connections between the various components of the device. Furthermore, the devices of the prior art for the production of ice for domestic use are essentially systems based on the mechanical compression of a vapor, which use a refrigerant fluid. In general, a simple removable ice tray is placed in a refrigerated compartment maintained at a temperature of between −10° C. and −22° C. The water contained in the ice tray then freezes over several hours (typically around 4 to 5 hours for about 200 g of water) by heat exchange with the air in the refrigerated compartment. The pieces of ice are preserved in said refrigerated compartment for periods that may range from a few days to a few tens of days, causing their quality to degrade, or even contaminating the pieces of ice with mineral inclusions and/or pollutants, so that ultimately the ice is unsuitable for consumption.

SUMMARY OF THE INVENTION

The object of the present invention is to provide a method and a device that are less complex for high-power, useful and rapid refrigeration, especially for the rapid production of ice at an instant chosen by the operator, or for the continuous and/or periodic production of ice with relatively short cycle times (for example less than 10 minutes).

The method according to the invention for rapid refrigeration at a useful temperature $T_U$ employs a thermochemical system based on the coupling of reversible physico-chemical phenomena between a gas and a solid or liquid sorbent, said phenomena being exothermic in one direction and endothermic in the other direction, called the LT phenomenon and the HT phenomenon, said phenomena being such that, at a given pressure, the equilibrium temperature of the LT phenomenon is below the equilibrium temperature of the HT phenomenon. Said method consists in carrying out at least one cycle consisting of a refrigeration step and a regeneration step starting from an initial state in which a reactor in which the LT phenomenon occurs and a reactor in which the HT phenomenon occurs are at the ambient temperature and isolated from each other, the refrigeration step consisting of the endothermic phase of the LT phenomenon, which releases a refrigerant fluid G in gas form, the regeneration step consisting of the endothermic phase of the HT phenomenon, which releases the fluid G in gas form. The method is characterized in that:

the LT phenomenon is a liquid/gas phase change of the fluid G or an absorption of the fluid G by a liquid sorbent;

the HT phenomenon is a reversible sorption of the fluid G by a liquid or solid sorbent;

the endothermic phase of the LT phenomenon, corresponding to refrigeration, takes place in a reactor thermally isolated from the ambient environment; and the exothermic phase of the LT phenomenon, corresponding to regeneration, takes place in a condenser in communication with the reactor in which the HT phenomenon takes place, the condensed fluid G then being transferred into the reactor in which the endothermic phase of the LT phenomenon takes place.

DETAILED DESCRIPTION OF THE PREFERRED EMBODIMENTS

Figure 1:
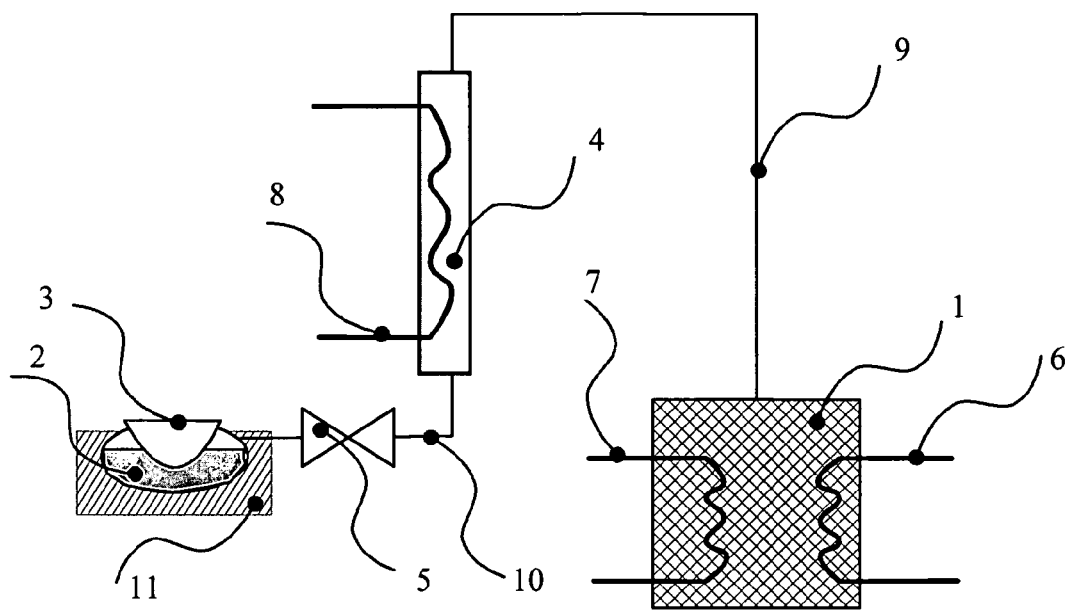
FIG. 1 illustrates an embodiment of a device according to the present invention.

In one particular way of implementing the method of the invention:

the refrigeration step comprises:

a phase A1 during which the reactor in which the HT phenomenon takes place (hereinafter denoted by HT reactor) and the reactor in which the LT phenomenon takes place (denoted hereafter by LT reactor) are placed in communication with each other; and a phase A2 during which the HT and LT reactors are isolated from each other and the HT reactor is heated; and the regeneration step comprises:

a phase C during which the HT reactor is heated and in permanent communication with a condenser;

a phase D consisting in transferring the fluid G in liquid form from the condenser to the LT reactor; and a phase E consisting in cooling the HT reactor in order to return it to the initial conditions.

When implementing the method of the invention, it is essential for the reactor in which the reversible HT phenomenon takes place to be in communication with the condenser during the regeneration step. During the refrigeration step, said HT reactor and the condenser may or may not be in communication with each other. Permanent communication between them means that the otherwise necessary operations of re-establishing communication following an interruption can be avoided.

The phase A1 is an active refrigeration phase: communication between the HT and LT reactors causes the spontaneous production of gas G in the LT reactor. Since this phenomenon is endothermic, it generates refrigeration. The phase A2 is a passive refrigeration phase: although there is no longer any release of gas in the LT reactor, because the LT and HT reactors are isolated from each other, refrigeration takes place owing to the fact that the thermal mass of the LT reactor itself absorbs heat. In parallel, the heating of the HT reactor allows it to be placed under the regeneration conditions, thereby releasing in gas form the fluid G that was absorbed by the sorbent of the HT reactor during the preceding refrigeration phase. During step C, the release in gas form of the fluid G from the HT reactor continues, and the gas is transferred to the condenser in which it spontaneously condenses, the heat of condensation being extracted by means with which the condenser is provided. The flow into a condenser of the fluid G released in gas form during step C makes it possible, during step D, to introduce the cooled refrigerant fluid G in liquid form into the LT reactor, thereby limiting the temperature rise in the LT reactor and speeding up the start of the endothermic (useful refrigeration) step during the next cycle in said LT reactor. The operating cycles of the device are thus very short.

The duration of step D is very short, typically less than 1 minute. Step D may be carried out during the execution of step C.

When the method aims to produce ice, the latter is formed on a support located inside the LT reactor. The method may then include an intermediate phase B between the passive refrigeration phase A2 and the phase C of the regeneration step, for the purpose of separating the pieces of ice from the support on which they form. This intermediate step B may consist in bringing the condenser into communication with the LT reactor for a very short period (typically less than 1 minute) so as to bring some of the hot gas released by the endothermic step of the HT reactor into proximity with the support on which the pieces of ice form. The intermediate phase B may also be carried out by other means, especially by electrical resistance elements integrated into or attached to the wall of the LT reactor, or placed in the reactor BT, near the ice support.

In one particular method of implementation, during step A1, the heat generated by the exothermic step in the HT reactor is extracted so as to maintain the temperature in said reactor at a value below its equilibrium temperature. This results in more rapid operation of the device, with greater efficiency.

The method according to the present invention may be implemented in a device as shown in FIG. 1. Said device comprises two reactors (1) and (2), and a condenser (4) provided with means (8) for extracting the heat. The reactor (2) (where the LT phenomenon takes place) is connected to the condenser (4) via a line (10) provided with a valve (5), and the condenser (4) is connected to the reactor (1) (where the HT phenomenon takes place) via a line (9). The reactor (1) is provided with heating means (6) and with means (7) for extracting the heat, and it contains a liquid or solid sorbent capable of creating a reversible phenomenon with a refrigerant fluid G. The reactor (2) includes means (11) that allow it to be thermally isolated from the ambient medium, and it contains the liquid form of the refrigerant fluid G or a liquid sorbent capable of absorbing the refrigerant fluid G. It is particularly advantageous to use an evaporator as reactor (2). During phase A1 of the refrigeration step, the fluid G released in gas form by the reactor (2) flows into the reactor (1) via the line (10), the inactivated condenser (4) and the line (9). In this embodiment, the condenser (4) is permanently connected to the reactor (1), whereas the reactor (2) is connected to the reactor (1) only during phases A1, B and D. When the device is intended for producing ice, an ice tray (3) is placed in the reactor (2) in such a way that at least part of the tray is in contact with the refrigerant fluid.

Figure 2:
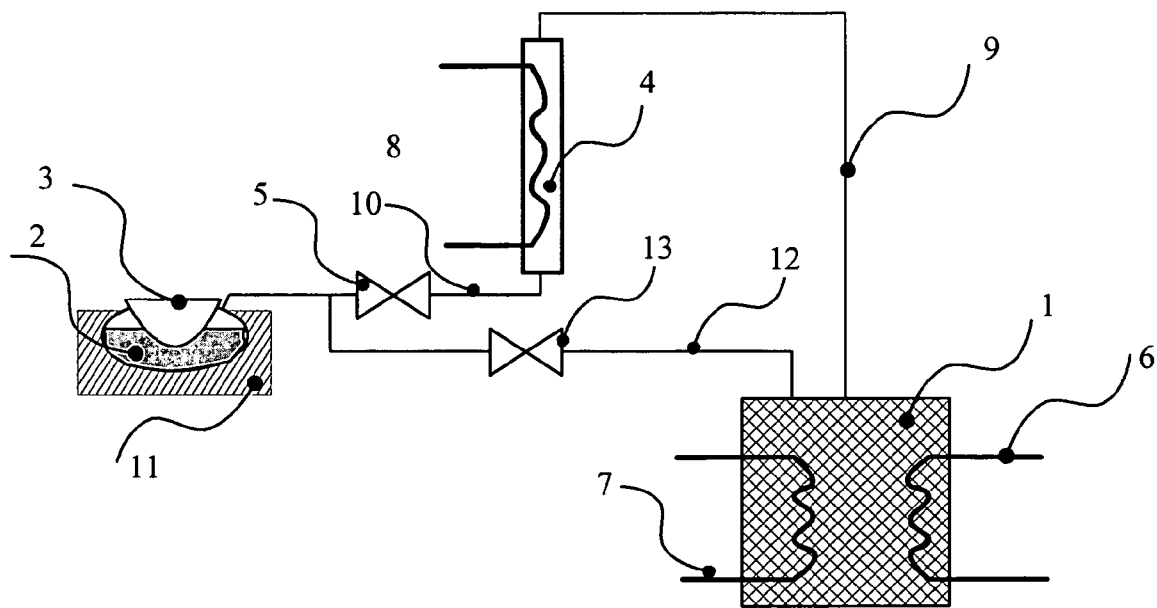
FIG. 2 illustrates another embodiment of a device according to the present invention.

In another embodiment, shown in FIG. 2, the device further includes a line (12) provided with a valve (13) that connects the reactors (1) and (2) directly.

In a device according to the invention, during the refrigeration step corresponding to the exothermic phase of the HT phenomenon, it is particularly advantageous to maintain, in the reactor (1), the temperature at a level below the equilibrium temperature so as to improve the efficiency and the speed of the reaction. This object may be achieved using a reactor (1) provided with means for extracting or absorbing the heat during this exothermic step. This object may also be achieved using a reactor (1) in which a reversible phenomenon takes place between an active solid and the fluid G, said active solid being mixed with a porous material having a high thermal diffusivity. Advantageously, the porous material is a recompressed expanded natural graphite. The active solid may be active carbon when the refrigerant fluid is methanol or ammonia. The active solid may also be chosen from reactive salts, such as alkaline-earth metal halides (for example chlorides such as $MnCl_2$, $SrCl_2$ and $NiCl_2$, bromides such as $CaBr_2$ and $SrBr_2$, and sulphates such as $CuSO_4$) that are intended to react reversibly with an active gas, for example ammonia or its derivatives, such as monomethylamine and dimethylamine.

The implementation of the method of the invention using a device as shown in FIG. 1 will be described in detail below for a device in which the reactor (2) is an evaporator, the refrigerant fluid is denoted by G and the reactor (1) contains an active solid S. The evaporator includes an integrated ice tray (3) containing a liquid to be frozen. The state of the device during the various steps is shown by Clausius-Clapeyron plots (FIGS. 3 to 8) in which P represents the pressure and T the temperature, the L/G curves show the equilibrium curves of the liquid/gas change of state in the evaporator, and the S/G curves show the equilibrium curves of the sorption phenomenon in the reactor (1). $T_{AM}$ denotes the ambient temperature, $T_{EV}$ denotes the temperature in the evaporator, $T_{RE}$ denotes the temperature in the reactor (1), $T_{EQ}$ denotes the equilibrium temperature of the sorption phenomenon in the reactor (1), $P_{EV}$ denotes the pressure in the evaporator, $P_{RE}$ denotes the pressure in the reactor (1) and $T_{REG}$ denotes the regeneration temperature. The labels CV and OV denote that the valve (5) placed between the evaporator and the condenser is closed and open, respectively.

Figure 3:
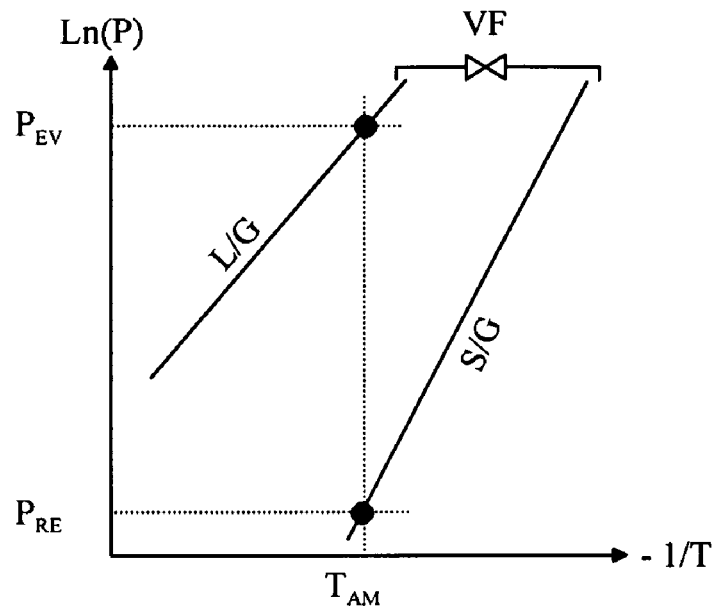
FIG. 3 shows the initial state of the first operating cycle of the device by Clausius- Clapeyron plot.

The initial state of the first operating cycle of the device is shown in FIG. 3. At this instant, the evaporator is filled with refrigerant fluid G in liquid form, while the active solid S contained in the reactor (1) has a composition lean in fluid G. The evaporator and the reactor (1) are at the ambient temperature $T_{AM}$ and at their respective equilibrium pressures: the evaporator is at high pressure $P_{EV}$, whereas the reactor is at low pressure $P_{RE}$. The condenser, which does not contain liquid, is at the ambient temperature and at the pressure of the reactor. The valve (5) is closed.

Figure 4:
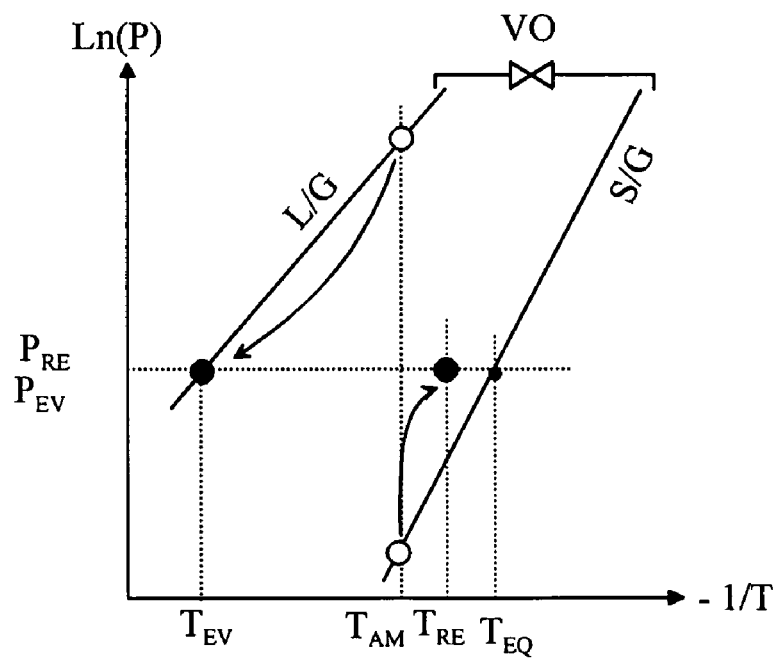
FIG. 4 shows the state of the device in phase A1, corresponding to instantaneous active refrigeration, by Clausius-Clapeyron plot.

Step A1, corresponding to instantaneous active refrigeration, is shown in FIG. 4: the evaporator and the reactor (1) are placed in communication via the condenser, which remains inactive and thus constitutes a simple pipe for gas to flow from the evaporator to the reactor (1). The refrigerant fluid contained in liquid form in the evaporator evaporates and causes a sudden drop in the temperature of the evaporator, thereby rapidly freezing the water contained in the tray in order to form ice. The fluid released in gas form by the evaporator is absorbed by the active solid in the reactor (1), causing the temperature in the reactor to rise owing to the exothermic sorption. Because of the flow of cold gas, the temperature of the wall of the condenser decreases, which will subsequently favor condensation of the gas during the regeneration phase of the reactor. In a first step, the energy produced by the reaction in the reactor (1) is absorbed by the thermal mass of the reactor. This has the effect of increasing the temperature of the contents of the reactor (1), which approaches its thermodynamic equilibrium, causing a reduction in refrigeration. When the reactor includes means (7) for extracting the heat, this heat exchanger makes it possible to extract that part of the energy produced by the synthesis reaction which was not absorbed by the thermal mass of the contents of the reactor (1) and to cool the reactor so as to maintain the reactive solid under the synthesis conditions ($T_{IE} < T_{EQ}$), thereby limiting the reduction in refrigeration. Initially, the instantaneous refrigeration power produced is high because of the large temperature difference ($T_{EQ} - T_{AM}$) initially observed in the reactor (1).

Figure 5:
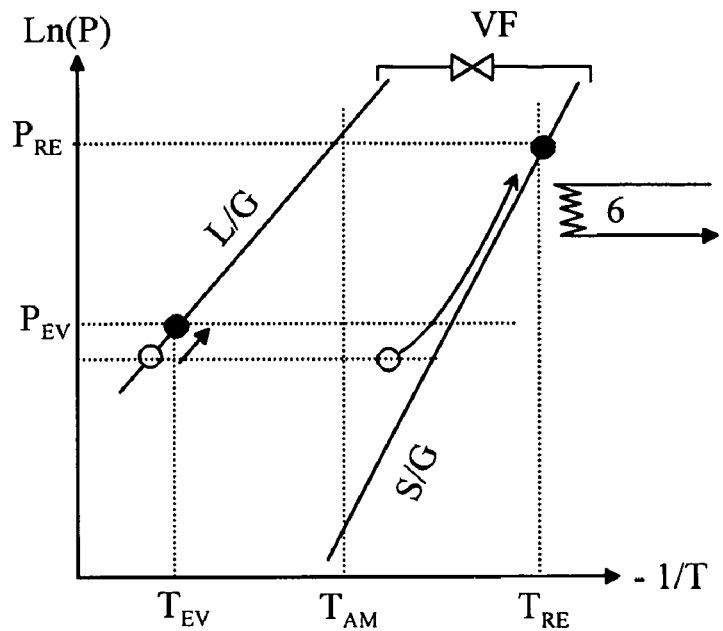
FIG. 5 shows the the state of the device in phase A2 by Clausius-Clapeyron plot.

In phase A2, the valve (5) is closed. The reactor (1) is isolated from the evaporator but remains in communication with the condenser. The reactor (1) is then heated. This heating allows the reactor (1) to move along its thermodynamic equilibrium curve, simultaneously increasing the temperature and the pressure in the reactor (1) and in the inactive condenser (4). In the evaporator, the refrigerant fluid no longer evaporates because the valve (5) is closed. However, refrigeration continues passively, because the thermal mass of the evaporator in turn absorbs the heat needed to continue the freezing of the water in the ice tray. The state of the device during phase A2 is shown in FIG. 5.

Figure 6:
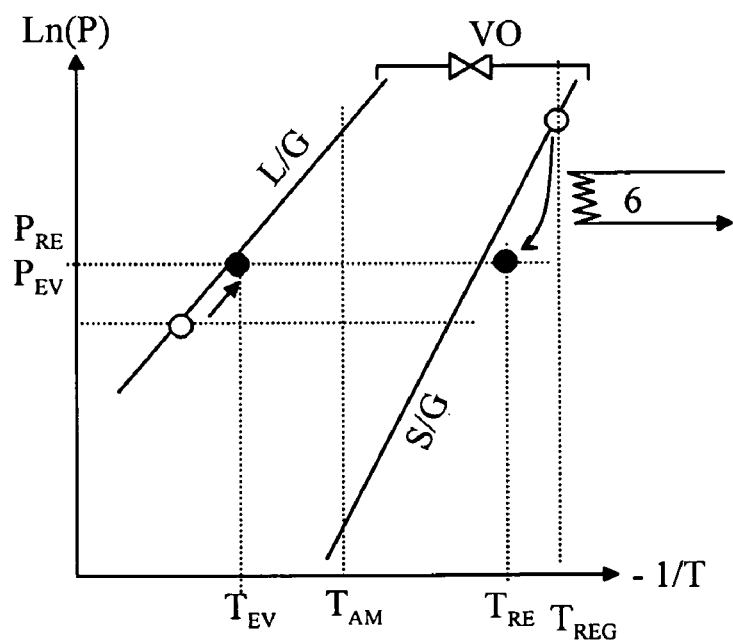
FIG. 6 shows the state of the device in phase B by Clausius-Clapeyron plot.

In phase B, the step of bringing the reactor (1) placed under high-pressure regeneration conditions into communication, for a short period (for example a few tens of seconds), with the evaporator maintained at low pressure by its thermal mass makes it possible for the gas in the reactor (1) to be rapidly desorbed. The evaporator, which receives hot gas coming from the reactor (1), then acts as a condesnor for a short period. This phase allows the pieces of ice to separate from the wall of the ice tray when the hot gas arrives in the appropriate region of the surface of the ice tray. Furthermore, the temperature difference ($T_{RE}-T_{EQ}$) initially observed in the reactor owing to the pressure difference allows the reactive gas to be rapidly desorbed, thus speeding up the regeneration phase. The state of the device in this phase is represented in FIG. 6.

Figure 7:
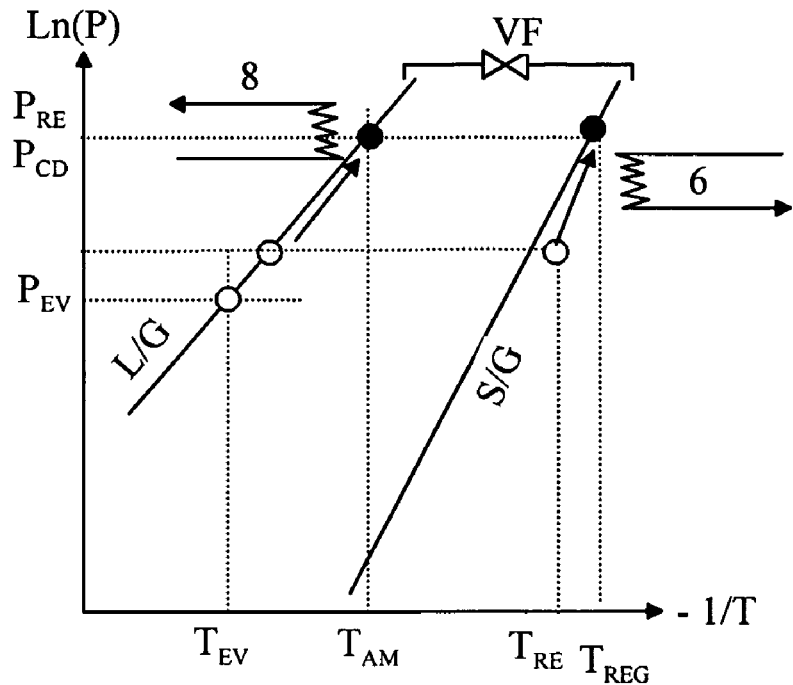
FIG. 7 shows the state of the device in phase C, the rapid regeneration phase, by Clausius-Clapeyron plot.

Phase C is the rapid regeneration phase of the device. As soon as the pieces of ice have been separated (it being possible for them subsequently to be removed), the valve (5) is again closed. The heating of the reactor (1) is maintained, which continues the desorption of the gas, said gas being transferred to the cooled condenser via the means (8), in which condenser it condenses. The condensed gas progressively accumulates in liquid form in the bottom of the condenser. The state of the device is shown in FIG. 7.

Figure 8:
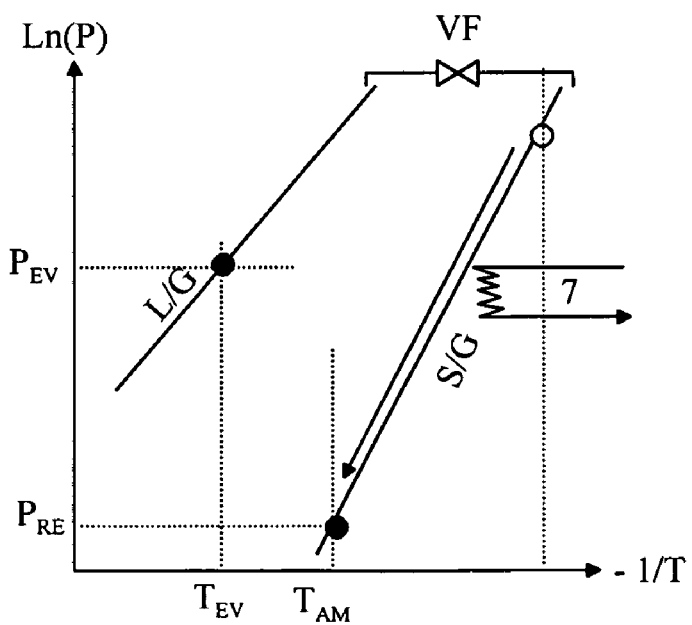
FIG. 8 shows the the state of the device in phase D by Clausius-Clapeyron plot.

Phase D starts as soon as the regeneration is completed. The reactor (1) is cooled and the valve (5) is opened for a short period (typically a few tens of seconds). The high pressure in the condenser allows the condensed gas contained in the condenser to be sent into the evaporator, which thus fills with liquid. The evaporator remains at a lower temperature than if it had served as a condenser. This reduces the cycle time and improves the efficiency of the refrigeration system through the fact that the amount of heat to be extracted in order to lower the temperature of the evaporator is reduced. Next, the valve is reclosed and the isolated reactor (1) continues to be cooled, resulting in a reduction in temperature and in pressure. The device is thus under the initial conditions of the refrigeration storage phase at the start of the second operating cycle. The state of the device during this phase is shown in FIG. 8.

When the method is employed in a device such as the one shown in FIG. 2, which includes a line (12) provided with a valve (13) that connects the reactor (1) directly to the evaporator, the device operates in a similar manner. In the initial state of the first operating cycle, the valves (5) and (13) are closed. During phase A1, the valve (13) is open so as to bring the reactor (1) directly into communication with the evaporator, it being possible for the valve (5) to be open or closed. During phases A2 and C, both valves are closed. During step B, at least one of the valves (13) and (5) is open. During step D, the valve (13) is closed and the valve (5) is open. At the end of step D, both valves are closed.

When the object of the method is to produce ice, the reactor (2) is advantageously an evaporator that includes an ice tray (3). The evaporator is intended to collect the refrigerant fluid in liquid form which, by evaporating, causes refrigeration. It is thermally isolated from the environment, thereby reducing the refrigeration losses to the ambient environment. In a preferred embodiment, the ice tray forms an integral part of the evaporator. In another embodiment, the ice tray is simply fixed to or placed on a wall of the evaporator that is in contact with the boiling refrigerant fluid, either directly or via fins.

The wall of the ice tray must be made of a material that has a high thermal diffusivity (that is to say a low thermal capacity, which allows the wall temperature to fall rapidly) and a high thermal conductivity, which favors rapid ice formation, which material is compatible with the refrigerant fluid and has a high pressure resistance. Aluminum-based materials (for example 5086 or 5083 aluminum) and steels meet these criteria when the refrigerant fluid is ammonia.

An evaporator that includes an integrated ice tray may be formed by two hollow sections that have different concavities and are joined together along their longitudinal edges, the section having the smaller concavity being placed above the section having the larger concavity, the respective concave parts being upwardly directed. The concavities may be formed for example by portions of circular or elliptical arcs of different diameters, the sections then being portions of longitudinally truncated tubes of cylindrical or elliptical cross section.

The sections may be in contact over their lower generatrices. The upper section constitutes the ice tray and the lower section constitutes the refrigerant fluid reservoir. This geometry allows direct contact between the boiling refrigerant fluid and the lower wall of the ice tray.

It is preferable for the ice tray to be divided into compartments by partitions that allow separate ice pieces of the desired shape to be obtained. Said partitions furthermore have the effect of increasing the stiffness of the assembly and of increasing the heat transfer, in order to promote rapid ice formation.

To avoid too high a rise in temperature in the evaporator during the non-active refrigeration phases, the thermal capacity may be further improved by the use of hollow partitions that contain a phase change material, or by using a lower section provided with cells filled with a phase change material.

The partitions preferably include notches that make it easier for the tray to be uniformly filled with water and for the pieces of ice to be separate from one another during the removal phase.

Fins may be placed in the space between the two sections in order to improve the thermal diffusivity. The fins may be hollow and contain a phase change material.

Figure 9:
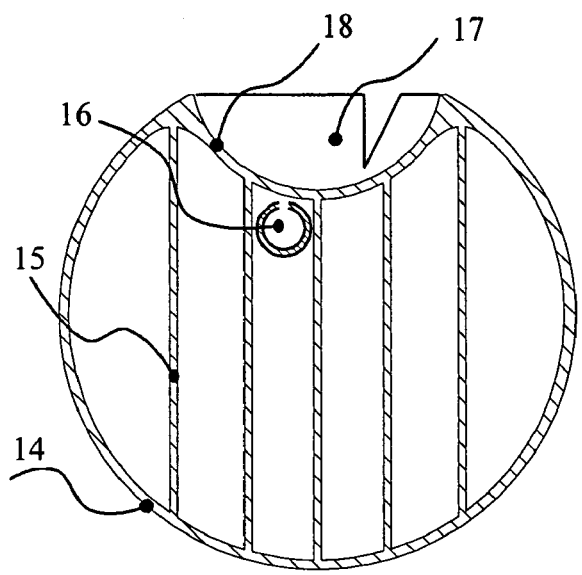
FIG. 9 shows a cross-sectional view of one embodiment of an evaporator.
Figure 10:
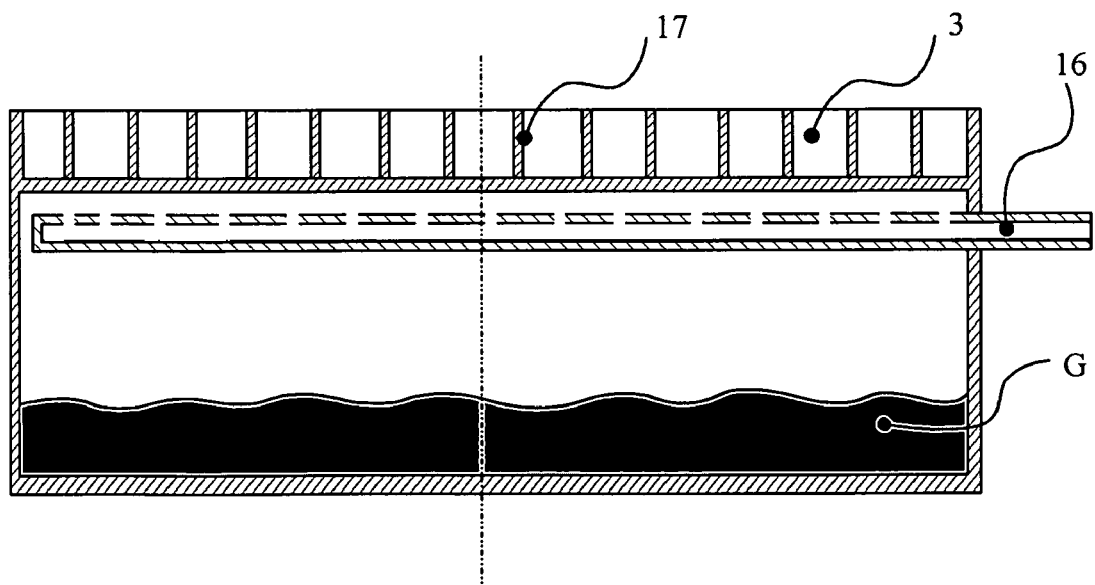
FIG. 10 shows a longitudinal sectional view of one embodiment of an evaporator.

One embodiment of an evaporator in which the sections have a cylindrical concavity and the respective cross-sections of the sections are such that the distance between the longitudinal edges of one of the sections is identical to the distance between the longitudinal edges of the other section, the two sections being joined together along their longitudinal edges, is shown in FIGS. 9 and 10. FIG. 9 shows a cross-sectional view and FIG. 10 is a longitudinal sectional view. The evaporator is formed by a lower section (14) which is closed at its two ends and includes, in its upper part, a longitudinal groove formed by the upper section (18) having the smaller diameter. Said upper section forms the ice tray (3), which may contain several pieces of ice separated by partitions (17), the material of which is preferably chosen to improve the diffusion of heat from the ice. Fins (15), which be hollow and contain a phase change material, are placed inside the evaporator, either along the longitudinal direction, as shown in FIG. 9, or along the transverse direction (not shown). A tube (16) connected to the line for transferring the gas G between the evaporator and the reactor (1) enters the cylindrical chamber of the evaporator via a bore made in one of the ends of the cylinder, and it is placed directly beneath the wall of the ice tray (3). The refrigerant fluid G is shown in the form of a boiling liquid in the bottom of the evaporator.

Figure 11A:
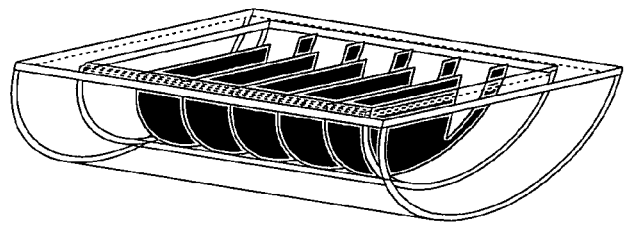
FIGS. 11a and 11b illustrate an embodiment of a device according to the present invention in which the sections have a cylindrical concavity and are such that the distance between the longitudinal edges of the larger-diameter section is greater than the distance between the longitudinal edges of the other section, the bottom of the smaller diameter section being placed above the bottom of the larger-diameter section.
Figure 11B:
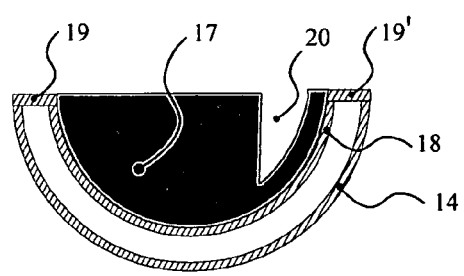

An embodiment in which the sections have a cylindrical concavity and are such that the distance between the longitudinal edges of the larger-diameter section is greater than the distance between the longitudinal edges of the other section, the bottom of the smaller-diameter section being placed above the bottom of the larger-diameter section, is illustrated by FIGS. 11a and 11b. FIG. 11a is a schematic perspective "see-through" view. FIG. 11b is a schematic cross-sectional view. The bottoms of the lower section (14) and upper section (18) are not in contact with each other, but their respective longitudinal edges are joined together by the longitudinal segments (19) and (19'). Partitions (17) that include a notch (20) divide the ice tray formed by the concave part of the section (18) into compartments.

Figure 12A:
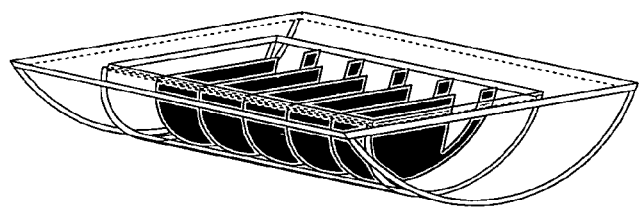
FIGS. 12a and 12b illustrate an embodiment of a device according to the present invention in which the sections have a cylindrical concavity and are such that the distance between the longitudinal edges of the larger-diameter section is greater than the distance between the longitudinal edges of the other section, the bottom of the smaller diameter section being in contact with the bottom of the larger-diameter section.
Figure 12B:
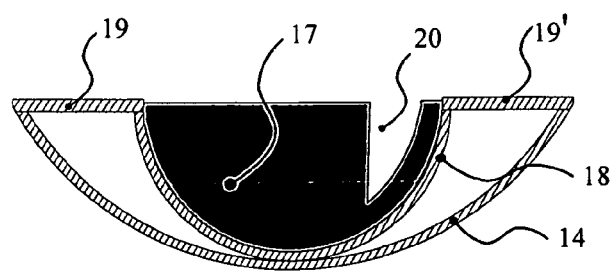

An embodiment in which the respective cross-sections of the sections are such that the distance between the longitudinal edges of the larger-diameter section is greater than the distance between the longitudinal edges of the other section, the bottom of the smaller-diameter section being in contact with the bottom of the larger-diameter section, is illustrated by FIGS. 12a and 12b. FIG. 12a is a schematic perspective "see-through" view while FIG. 12b is a schematic cross-sectional view. The bottoms of the lower section (14) and upper section (18) are in contact with each other, and their respective longitudinal edges are joined together by the longitudinal segments (19) and (19'). Partitions (17) that include a notch (20) divide the ice tray formed by the concave part of the section (18) into compartments.

Figure 13:
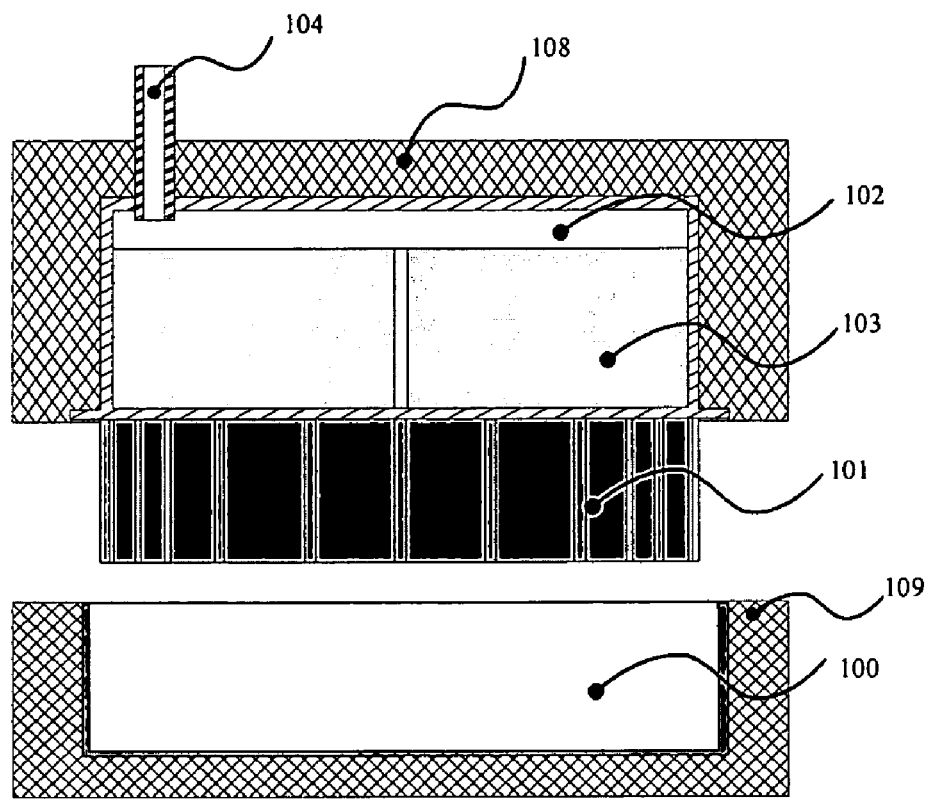
FIG. 13 illustrates an embodiment of an evaporator in which the ice tray is formed by a simple container.

FIG. 13 shows another embodiment of an evaporator, in which the ice tray is formed by a simple container (100) intended to collect the liquid to be frozen. This container is provided with a thermal insulator (109) placed around the periphery in order to limit heat losses with the environment. It is removable and fits onto the lower part of the evaporator (102), which also includes a thermal insulator (108). The evaporator (102) is provided with external fins (101) that are immersed in the ice tray and with internal fins (103) making it possible to intensify the boiling of the refrigerant fluid. The evaporator is also provided with a pipe (104) for connecting it to the rest of the device.

The invention claimed is:

1. A method for rapid refrigeration at a useful temperature $T_U$ which employs a thermochemical system based on the coupling of reversible physico-chemical phenomena between a gas and a solid or liquid sorbent, said physico-chemical phenomena comprising a LT phenomenon and a HT phenomenon, each of the LT phenomenon and the HT phenomenon being exothermic in one direction and endothermic in the other direction, said physico-chemical phenomena being such that, at a given pressure, the equilibrium temperature of the LT phenomenon is below the equilibrium temperature of the HT phenomenon, said method comprising carrying out at least one cycle consisting of a refrigeration step and a regeneration step starting from an initial state in which a reactor in which the LT phenomenon occurs and a reactor in which the HT phenomenon occurs are at the ambient temperature and isolated from each other, the refrigeration step consisting of the endothermic phase of the LT phenomenon, which releases a refrigerant fluid G in gas form, the regeneration step consisting of the endothermic phase of the HT phenomenon, which releases the fluid G in gas form, wherein in said method:

the LT phenomenon is a liquid/gas phase change of the fluid G or an absorption of the fluid G by a liquid sorbent;

the HT phenomenon is a sorption of the fluid G by a liquid or solid sorbent;

the endothermic phase of the LT phenomenon takes place in a reactor thermally isolated from the ambient environment;

the exothermic phase of the LT phenomenon takes place in a condenser in permanent communication with the reactor in which the HT phenomenon takes place, the condensed fluid G then being transferred into the reactor in which the endothermic phase of the LT phenomenon takes place;

the refrigeration step consisting of the endothermic phase of the LT phenomenon, which releases a refrigerant fluid G in gas form, comprises:

a phase A1 during which the reactor in which the HT phenomenon takes place and the reactor in which the LT phenomenon takes place are placed in communication with each other; and a phase A2 during which the HT and LT reactors are isolated from each other and the HT reactor is heated; and the regeneration step consisting of the endothermic phase of the HT phenomenon, which releases the fluid G in gas form, comprises:

a phase C during which the HT reactor is heated and in permanent communication with a condenser, said condenser being isolated from said reactor in which the LT phenomenon takes place during at least part of phase C;

a phase D consisting in transferring the fluid G in liquid form from the condenser to the LT reactor; and a phase E consisting in cooling the HT reactor in order to return it to the initial conditions.

2. The method as claimed in claim 1, implemented for ice production, wherein it comprises, between passive refrigeration phase A2 and phase C of the regeneration step, an intermediate phase B for separating pieces of ice from a support.

3. The method as claimed in claim 2, wherein phase B consists in bringing the condenser into communication with the LT reactor for a short period so as to bring some of a hot gas released by the endothermic step of the HT reactor into proximity with the support on which the pieces of ice form.

4. The method as claimed in claim 2, wherein phase B is implemented using electrical resistance elements integrated into or attached to the wall of the LT reactor, or in the reactor BT, near the ice support.

5. The method as claimed in claim 1, wherein, during phase A1, the heat generated by the exothermic step in the HT reactor is extracted.

6. The method as claimed in claim 1, wherein the reactor in which the HT phenomenon takes place and the condenser are permanently in communication with each other.

7. A device for implementing rapid refrigeration at a useful temperature $T_U$ which employs a thermochemical system based on the coupling of reversible physico-chemical phenomena between a gas and a solid or liquid sorbent, wherein the device comprises:

a first reactor and a second reactor and a condenser provided with means for extracting the heat;

the condenser is connected to the first reactor via a first line;

the second reactor is connected to the condenser via a second line provided with a valve;

the first reactor is provided with heating means and with means for extracting the heat, said first reactor containing a liquid or solid sorbent capable of reversibly sorbing a refrigerant fluid G; and the second reactor includes means for thermally isolating said second reactor from the ambient medium, and said second reactor containing the liquid form of the refrigerant fluid G or a liquid sorbent capable of absorbing the refrigerant fluid G.

8. The device as claimed in claim 7, wherein the device further includes a third line provided with a valve that connects the first reactor directly to the second reactor.

9. The device as claimed in claim 7, wherein the second reactor is an evaporator.

10. The device as claimed in claim 7, wherein the second reactor is an evaporator provided with an ice tray.

11. The device as claimed in claim 10, wherein the ice tray forms an integral part of the evaporator.

12. The device as claimed in claim 10, wherein the ice tray is fixed to or placed on a wall of the evaporator that is in contact with a boiling refrigerant fluid, directly or via fins.

13. The device as claimed in claim 11, wherein the evaporator is formed by two hollow sections that have different concavities and are joined together along their longitudinal edges, the section having the smaller concavity being placed above the section having the larger concavity, the respective concave parts being upwardly directed, the section having the smaller concavity forming the ice tray and the section having the larger concavity forming the reservoir for the refrigerant fluid.

14. The device as claimed in claim 13, wherein the concavities are formed by portions of circular or elliptical arcs of different diameters, the sections being portions of longitudinally truncated tubes of cylindrical or elliptical cross-section.

15. The device as claimed in claim 13, wherein the sections are in contact with each other along their lower generatrices.

16. The device as claimed in claim 10, wherein the ice tray is divided into compartments by partitions.

17. The device as claimed in claim 16, wherein the partitions are hollow and contain a phase change material.

18. The device as claimed in claim 13, wherein the lower section is provided with cells filled with a phase change material.

19. The device as claimed in claim 16, wherein the partitions include notches.

20. The device as claimed in claim 13, wherein fins are placed in the space between the two sections.

21. The device as claimed in claim 20, wherein the fins are hollow and contain a phase change material.

22. The device as claimed in claim 12, wherein:

the ice tray is formed by a container;

said container is provided with a thermal insulation placed around its periphery;

said container is removable and fits onto the lower part of the evaporator, which also includes a thermal insulator;

the evaporator is provided with external fins that are immersed in the ice tray and with internal fins; and the evaporator is provided with a pipe for connecting it to the rest of the device.

* * * * *